US010388052B2

(12) United States Patent
Haase et al.

(10) Patent No.: US 10,388,052 B2
(45) Date of Patent: Aug. 20, 2019

(54) METHODS AND SYSTEMS FOR ADJUSTING ANIMATION DURATION

(71) Applicant: Google LLC, Mountain View, CA (US)

(72) Inventors: Chet Haase, Pleasanton, CA (US); Daniel Marc Gatan Shiplacoff, Los Altos, CA (US)

(73) Assignee: GOOGLE LLC, Mountain View, CA (US)

( * ) Notice: Subject to any disclaimer, the term of this patent is extended or adjusted under 35 U.S.C. 154(b) by 591 days.

(21) Appl. No.: 14/272,073

(22) Filed: May 7, 2014

(65) Prior Publication Data
US 2015/0325026 A1 Nov. 12, 2015

(51) Int. Cl.
G06T 13/00 (2011.01)
G06T 13/80 (2011.01)

(52) U.S. Cl.
CPC .............. G06T 13/80 (2013.01); G06T 13/00 (2013.01)

(58) Field of Classification Search
CPC ......... G06T 13/00; G06T 13/80; G06T 13/20; G06T 2213/08
USPC .................................................. 345/418, 473
See application file for complete search history.

(56) References Cited

U.S. PATENT DOCUMENTS

| | | | |
|---|---|---|---|
| 6,081,278 A | 6/2000 | Chen | |
| 8,339,480 B2* | 12/2012 | Lee | H04N 1/00307 348/240.99 |
| 2003/0063090 A1 | 4/2003 | Kraft et al. | |
| 2003/0146915 A1* | 8/2003 | Brook | G11B 27/11 345/473 |
| 2008/0086688 A1* | 4/2008 | Chandratillake | G06F 17/30817 715/719 |
| 2008/0120569 A1* | 5/2008 | Mann | G06F 3/0481 715/792 |
| 2009/0167768 A1* | 7/2009 | Bull | G06T 13/00 345/473 |
| 2011/0080418 A1 | 4/2011 | Rhodes | |
| 2011/0122155 A1 | 5/2011 | Zechlin | |
| 2012/0198386 A1* | 8/2012 | Hautala | G06F 3/0481 715/838 |
| 2013/0057555 A1 | 3/2013 | Huang et al. | |
| 2013/0063455 A1* | 3/2013 | Bayer | H04N 21/41407 345/522 |
| 2013/0346885 A1* | 12/2013 | Singh | H04L 51/04 715/758 |
| 2014/0118354 A1* | 5/2014 | Pais | G09G 5/373 345/428 |
| 2014/0129121 A1* | 5/2014 | Fino | G01C 21/34 701/117 |

(Continued)

Primary Examiner — Michael Le
(74) Attorney, Agent, or Firm — McDonnell Boehnen Hulbert & Berghoff LLP

(57) ABSTRACT

A device that includes one or more processors may determine a configuration of a display region of the device. The device may also receive a request to perform an animation of a virtual object within the display region. The request may be indicative of a given duration for the animation based on the animation being performed within a given display region having a given configuration. The device may also modify the given duration to determine an adjusted duration for the animation based on a comparison between the configuration and the given configuration. The device may also perform the animation within the display region based on the animation having the adjusted duration.

20 Claims, 9 Drawing Sheets

(56) References Cited

U.S. PATENT DOCUMENTS

2014/0226901 A1* 8/2014 Spracklen .......... H04N 21/4621
382/167

* cited by examiner

METHODS AND SYSTEMS FOR ADJUSTING ANIMATION DURATION

BACKGROUND

Unless otherwise indicated herein, the materials described in this section are not prior art to the claims in this application and are not admitted to be prior art by inclusion in this section.

A computing device, such as a personal computer or smartphone, may include a display for rendering images or animations to a viewer of the display. In one example, an application configured to operate the device may provide instructions for performing an animation of a virtual object on the display. For example, the application may instruct the device to transition the virtual object from a first position to a second position on the display. Additionally, the application may specify a desired duration for the animation over which the device may transition the virtual object. In turn, the device may render a series of intermediate images of the virtual object that appear in a particular order in different positions along a path between the first position and the second position, such that the virtual object appears to be transitioning from the first position to the second position at a particular speed for the animation to be performed over the desired duration.

SUMMARY

In one example, a method is provided that comprises determining a configuration of a display region of a device by one or more processors of the device. The method further comprises receiving a request to perform an animation of a virtual object within the display region. The request may be indicative of a given duration for the animation based on the animation being performed within a given display region having a given configuration. The method further comprises modifying the given duration to determine an adjusted duration for the animation based on a comparison between the configuration and the given configuration. The method further comprises the one or more processors causing the device to perform the animation within the display region based on the animation having the adjusted duration.

In another example, a computer readable medium is provided. The computer readable medium may have instructions stored therein that when executed by a computing device, cause the computing device to perform functions. The functions comprise determining a configuration of a display region of the computing device. The functions further comprise receiving a request to perform an animation of a virtual object within the display region. The request may be indicative of a given duration for the animation based on the animation being performed within a given display region having a given configuration. The functions further comprise modifying the given duration to determine an adjusted duration for the animation based on a comparison between the configuration and the given configuration. The functions further comprise performing the animation within the display region based on the animation having the adjusted duration.

In yet another example, a device is provided that comprises one or more processors and data storage configured to store instructions executable by the one or more processors. The instructions may cause the device to determine a configuration of a display region of the device. The instructions may further cause the device to receive a request to perform an animation of a virtual object within the display region. The request may be indicative of a given duration for the animation based on the animation being performed within a given display region having a given configuration. The instructions may further cause the device modify the given duration to determine an adjusted duration for the animation based on a comparison between the configuration and the given configuration. The instructions may further cause the device to perform the animation within the display region based on the animation having the adjusted duration.

In still another example, a system is provided comprising a means for determining a configuration of a display region of a device. The system also comprises means for receiving a request to perform an animation of a virtual object within the display region. The request may be indicative of a given duration for the animation based on the animation being performed within a given display region having a given configuration. The system also comprises means for modifying the given duration to determine an adjusted duration for the animation based on a comparison between the configuration and the given configuration. The system also comprises means for causing the device to perform the animation within the display region based on the animation having the adjusted duration.

These as well as other aspects, advantages, and alternatives, will become apparent to those of ordinary skill in the art by reading the following detailed description, with reference where appropriate to the accompanying figures.

DETAILED DESCRIPTION

Figure 1A:
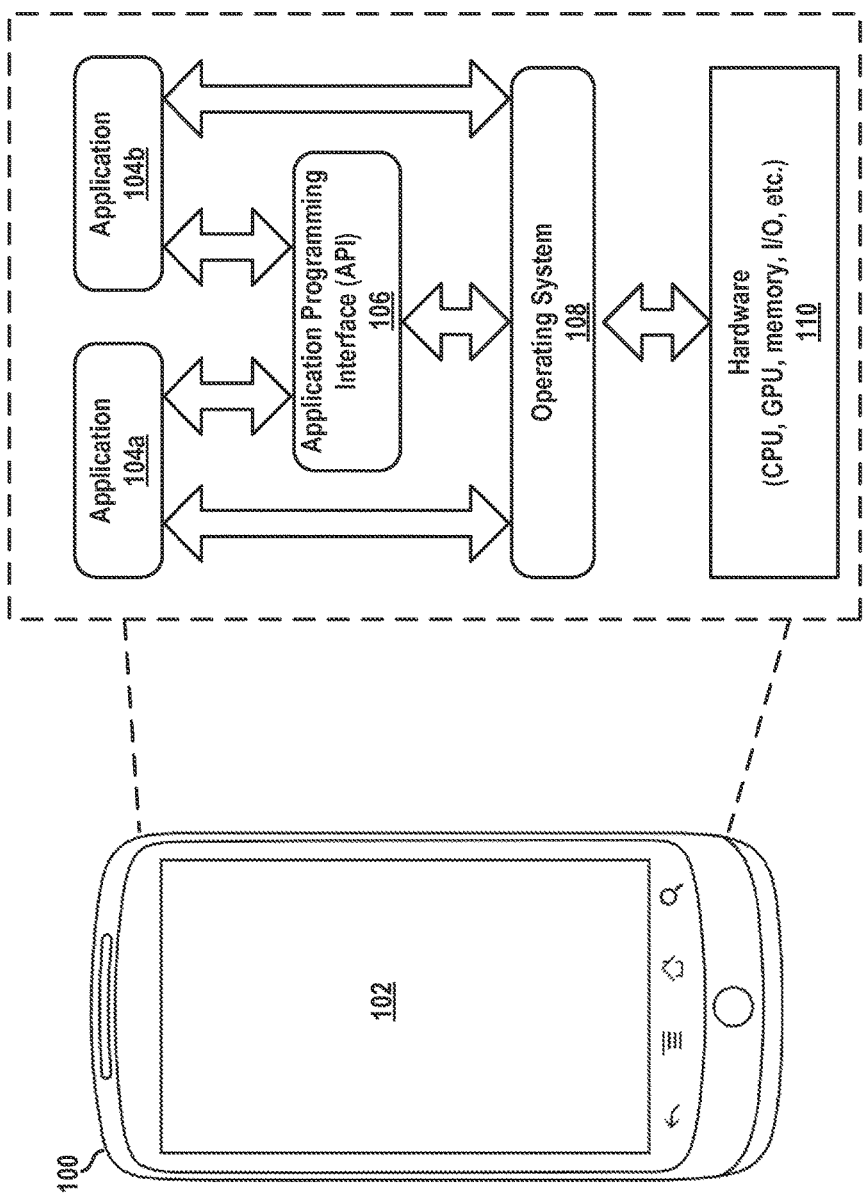
FIG. 1A illustrates a device, according to an example embodiment.

The following detailed description describes various features and functions of the disclosed systems and methods with reference to the accompanying figures. In the figures, similar symbols identify similar components, unless context dictates otherwise. The illustrative system, device and method embodiments described herein are not meant to be limiting. It may be readily understood by those skilled in the art that certain aspects of the disclosed systems, devices and methods can be arranged and combined in a wide variety of different configurations, all of which are contemplated herein.

A computing device may be configured to provide visual information on a display region of a display coupled to the device. In some examples, an application may instruct the device to perform an animation of a virtual object on the display region. For example, the animation may indicate fading the virtual object, changing a size of the virtual object, or traversing the virtual object from a first position to a second position on the display region. In turn, an operating system of the device may receive the request from the application and cause the device to perform the animation. For example, the operating system may cause the device to render a series of images of the virtual object from an initial state to a final state of the virtual object as a series of animation steps such that the virtual object appears to be transitioning smoothly from the initial state to the final state. Further, in some examples, the application may provide a given duration for such animation. Thus, for example, the operating system may cause the device to perform the animation steps at a speed that causes the virtual object to transition from the initial state to the final state over the given duration. Consequently, for example, a viewer of the animation may perceive the animation as intended by the application. For example, the viewer may perceive the animation as a continuous motion of the virtual object having an appropriate speed for the viewer to correctly perceive the animation. On one hand, if the animation were performed at a greater speed, the viewer may perceive the animation as a series of discrete steps rather than the continuous motion intended by the animation or may incorrectly deduce that the device is having performance issues. On the other hand, if the animation were performed at a lower speed, the viewer may be unable to perceive the animation as intended by the application (e.g., virtual object may appear to move slower than intended).

However, various viewing conditions of the display region may cause the given duration provided by the application to be inappropriate for providing the intended viewer perception of the animation.

In a first scenario, the application may be unable to anticipate a size of the display region. For example, the application may be configured to operate in various devices having various display sizes or the display region may only correspond to a portion of the display anticipated by the application. Thus, for example, the application may provide the given duration that is appropriate for a given display region having a given size. However, in this example, performing the animation over the given duration on another display region having a different size may cause the animation to be perceived incorrectly by the viewer.

In a second scenario, the application may provide the given duration that is appropriate for the given display region having a given resolution. For example, the animation may correspond to traversing the virtual object for a given number of pixels. In this example, if the animation were to be performed on the given display region having the given resolution, the given number of pixels may correspond to a given distance on the given display region. However, if the animation is performed on another display region having a different resolution, the given number of pixels may correspond to a different distance. Consequently, in this example, performing the animation over the given duration on the display region having the different resolution may cause the animation to be perceived incorrectly by the viewer.

In a third scenario, a position of the viewer relative to the display region may affect the viewer perception of the animation. For example, if the viewer is viewing the animation at a short distance to the display region, a viewing angle of the viewer may be wider than if the viewer was viewing the animation at a greater distance to the display region. Thus, if the animation is performed over the given duration, the viewer may perceive the virtual object traversing at a greater speed when the viewer is at the short distance than a corresponding speed when the viewer is at the greater distance. Again, in this example, the application may provide the given duration based on the viewer being at a given distance to the given display region that is different from an actual distance from the viewer to the display region. Therefore, in this example, performing the animation over the given duration may also cause the animation to be perceived incorrectly by the viewer.

Other scenarios for other viewing conditions are possible. Even if the application provides multiple durations for various viewing conditions, the application may be unable to anticipate other possible viewing conditions. For example, devices later developed that can execute the application to perform the animation may include additional configurations for the display region that were not anticipated by the application. Therefore, within examples, methods and systems are provided for adjusting duration of an animation in accordance with viewing conditions of the display region where the animation may be performed.

Example systems herein may be implemented in or may take the form of a computing device that includes and/or is coupled to a display. In an example implementation, an application programming interface (API) or an operating system of the computing device may provide instructions executable by one or more processors of the computing device to perform the functions described herein. Other implementations are possible.

FIG. 1A illustrates a device 100, according to an example embodiment. The device 100 may include a display 102 for providing visual information to a user of the device 100. Additionally, the device 100 may include applications 104*a* and 104*b*, an application programming interface (API) 106, and an operating system 108 for executing instructions to operate hardware 110 of the device 100. Although device 100 is illustrated in FIG. 1A as a smartphone, aspects of this disclosure are applicable to other computing devices such as personal computers, laptops, tablet computers, etc.

The display 102 may include a light emitting diode (LED) display, a liquid crystal display (LCD), a cathode ray tube (CRT) display, an e-ink screen, and/or any other suitable device for presenting a graphical user interface and/or visual information to the user of the device 100. Although illustrated in FIG. 1A that the display 102 is included in the device 100, in some examples, the display 102 may be implemented as an external display coupled to the device 100. For example, the display 102 may be an external monitor or projection screen configured to display the visual information provided by the device 100. In some examples, the display 102 may render virtual objects to a viewer of the display 102. For example, the display 102 may be configured to display a user interface of the application 104*a* or the application 104*b*. In some examples, the display 102 may be configured as a single display region for a specific function. In other examples, the display 102 may include multiple display regions for various functions. For example, a first display region of the display 102 may correspond with the user interface of the application 104*a*, and a second display region of the display 102 may correspond with the user interface of the application 104*b*. Other configurations are possible. For example, a third display region of the display 102 may be configured to render an animation of a virtual object, such as a button or image. Example animations may include fading, resizing, or traversing the virtual object from a first position to a second position in the third display region. Other example animations are possible.

Each of the applications 104a and 104b may include instructions that when executed cause the device 100 to perform specific tasks or functions. The applications 104a and 104b may be native applications (i.e., installed by a manufacturer of the device 100 and/or a manufacturer of the operating system 108) or may be a third-party application installed by a user of the device 100. A non-exhaustive list of example applications includes: a media player application that accepts media files as inputs and generates corresponding video and/or audio to output device(s) (e.g., the display 102, speakers, headphones, etc.); an e-reader application which accepts electronic documents (e.g., books, magazines, etc.) as an input and presents the content of the documents via the display 102; a feed reader that accepts feeds delivered over a network (e.g., RSS feeds and/or feeds from social network sites) as inputs and presents the feeds via the display 102; a map application that displays a map via the display 102; a note-taking application, a bookmarking application, a word processing application, spreadsheet application, and/or presentation application that accepts specifically formatted files as inputs and presents them via the display 102 for viewing and/or editing. Other example applications are possible.

The device 100 may also include one or more APIs, such as the API 106. The API 106 may function as an interface between the operating system 108 and the applications 104a and 104b. For example, the API 106 may provide the interface for receiving requests having a particular format from the application 104a and/or 104b, and may manage provision of the requests to the operating system 108. Further, in some examples, the API 106 may be configured to process requests that are directed to particular functions of the device 100, such as operation of the display 102. In other examples, the API 106 may be configured to process requests for any combination of functions of the device 100. Additionally or alternatively, the functions of the API 106 may be performed by the operating system 108. For example, the applications 104a and/or 104b may be configured to interface directly with the operating system 108.

The operating system 108 may interact with and manage hardware 110 to provide services for the applications 104a and 104b. For example, the application 104a may request the operating system 108 to perform an animation of a virtual object on a display region of the display 102.

The hardware 110 may include, for example, a central processing unit (CPU)), a graphics processor (GPU), memory, an input/output (I/O) interface, user input device (s), and output device(s) (e.g., the display 102). Components of hardware 110 may be controlled by instructions contained in applications 104a and 104b, the API 106, and the operating system 108.

The central processing unit (CPU) may be operable to effectuate the operation of the device 100 by executing instructions stored in memory or disk storage. Such instructions may include the operating system 108 and the applications 104a and 104b. The CPU may, for example, comprise a single or multi-core processor, an application specific integrated circuit (ASIC), field programmable gate array (FPGA), and/or any other suitable circuitry.

The graphics processor may be operable to generate a video stream for output to the display 102 based on instructions and/or data received from the CPU. Additionally or alternatively, the graphics processor may be operable to perform animations of virtual objects on a display region of the display 102. Thus, data structures corresponding to images to be displayed on the display 102 may be stored to and read from the memory or disk storage by the CPU. The CPU may convey such data structures to the graphics processor via a standardized application programming interface (API) such as, for example, the API 106, Standard Widget Toolkit (SWT), the DirectX Video Acceleration API, the Video Decode Acceleration Framework API, or other suitable API.

The memory may include program memory and run-time memory. The memory may, for example, comprise non-volatile memory, volatile memory, read only memory (ROM), random access memory (RAM), flash memory, magnetic storage, and/or any other suitable memory. Program memory may store instructions executable by the CPU to effectuate operation of the operating system 108 and the applications 104a and 104b. Runtime memory may store data generated or used during execution of the operating system 108 or applications 104a and 104b.

The input/output (I/O) interface may be operable to receive signals from the input device(s), and provide corresponding signals to the CPU and/or the graphics processor. The input device(s) may include, for example, a mouse, a touchpad, a motion sensor, a trackball, a voice recognition device, a keyboard, or any other suitable input device which enables a user to interact with the device 100. The output devices may include, for example, the display 102, additional displays, headphones, and/or speakers.

Figure 1B:
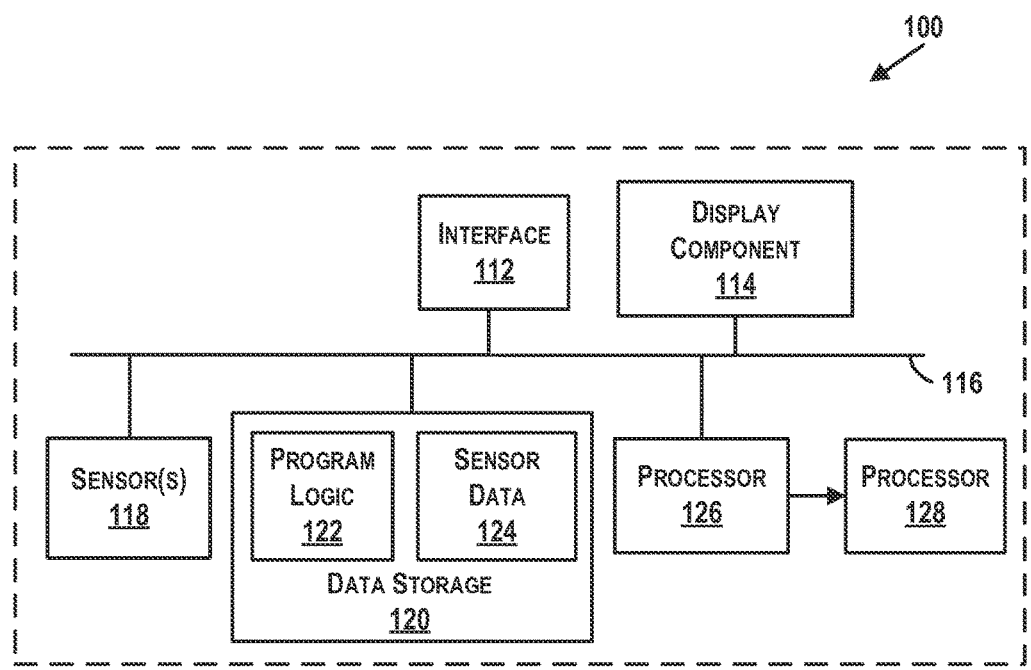
FIG. 1B is a block diagram illustrating components of the device in FIG. 1A.

FIG. 1B is a block diagram illustrating components of the device 100 in FIG. 1A. In some examples, some components illustrated in FIG. 1B may be distributed across multiple computing devices. However, for the sake of example, the components are shown and described as part of one example device 100.

In some implementations, the device 100 may include a device platform (not shown), which may be configured as a multi-layered platform. The device platform may include different applications and an application framework, as well as various kernels, libraries, and runtime entities. In other examples, other formats or systems may operate the device 100 as well.

The device 100 may include an interface 112, a display component 114, sensor(s) 118, data storage 120, and a processor 126. Components illustrated in FIG. 1B may be linked together by a communication link 116. In some examples, the device 100 may include hardware to enable communication within the device 100 and between the device 100 and another computing device (not shown), such as a server entity. The hardware may include transmitters, receivers, and antennas, for example.

The interface 112 may be configured to allow the device 100 to communicate with another computing device (not shown), such as a server. Thus, the interface 112 may be configured to receive input data from one or more computing devices, and may also be configured to send output data to the one or more computing devices. In some examples, the interface 112 may also maintain and manage records of data received and sent by the device 100. In other examples, records of data may be maintained and managed by other components of the device 100. The interface 112 may also include a receiver and transmitter to receive and send data. In some examples, the interface 112 may also include a user-interface, such as a keyboard, microphone, touch screen, etc., to receive inputs as well. Further, in some examples, the interface 112 may also include interface with output devices such as the display 102 of FIG. 1A.

The display component 114 may be a hardware interface that is configured to facilitate output of visual information via the display 102 of FIG. 1A. For example, the display component 114 may include circuitry that operates the display 102, or a communication interface (e.g., USB, HDMI, etc.) to couple the display 102 with the device 100. Other examples are also possible such as wireless communication interfaces (e.g., Wi-Fi, Bluetooth, etc.).

The sensor 118 may include one or more sensors, or may represent one or more sensors included in the device 100. Example sensors include an accelerometer, gyroscope, pedometer, light sensors, microphone, and/or other context-aware sensors. Additionally, the sensor 118 may include sensors for measuring distance such as a camera, motion detector, infrared range sensor, radar, lidar, or other distance measuring sensor.

The processor 126 may be configured to operate the device 100. For example, the processor 126 may be configured to cause the device 100 to perform an animation of a virtual object on the display 102. The processor 126 may also be configured to operate other components of the device 100 such as input/output components or communication components. The device 100 is illustrated to include an additional processor 128. The processor 128 may be configured to control some of the aspects described for the processor 126. For example, the processor 128 may be a GPU that operates the display 102, and the processor 128 may be configured to control other aspects such as the sensors 118. Some embodiments may include only one processor (e.g., processor 126) or may include additional processors configured to control various aspects of the device 100.

The data storage 120 may store program logic 122 that can be accessed and executed by the processor 126 and/or the processor 128. For example, the program logic 122 may include the instructions provided by the applications 104a and 104b, the API 106, and the operating system 108. The data storage 120 may also store collected sensor data 124 that may include data collected by any of the sensors 118.

The communication link 116 is illustrated as a wired connection; however, wireless connections may also be used. For example, the communication link 116 may be a wired serial bus such as a universal serial bus or a parallel bus, or a wireless connection using, e.g., short-range wireless radio technology, communication protocols described in IEEE 802.11 (including any IEEE 802.11 revisions), or Cellular technology, among other possibilities.

Figure 2:
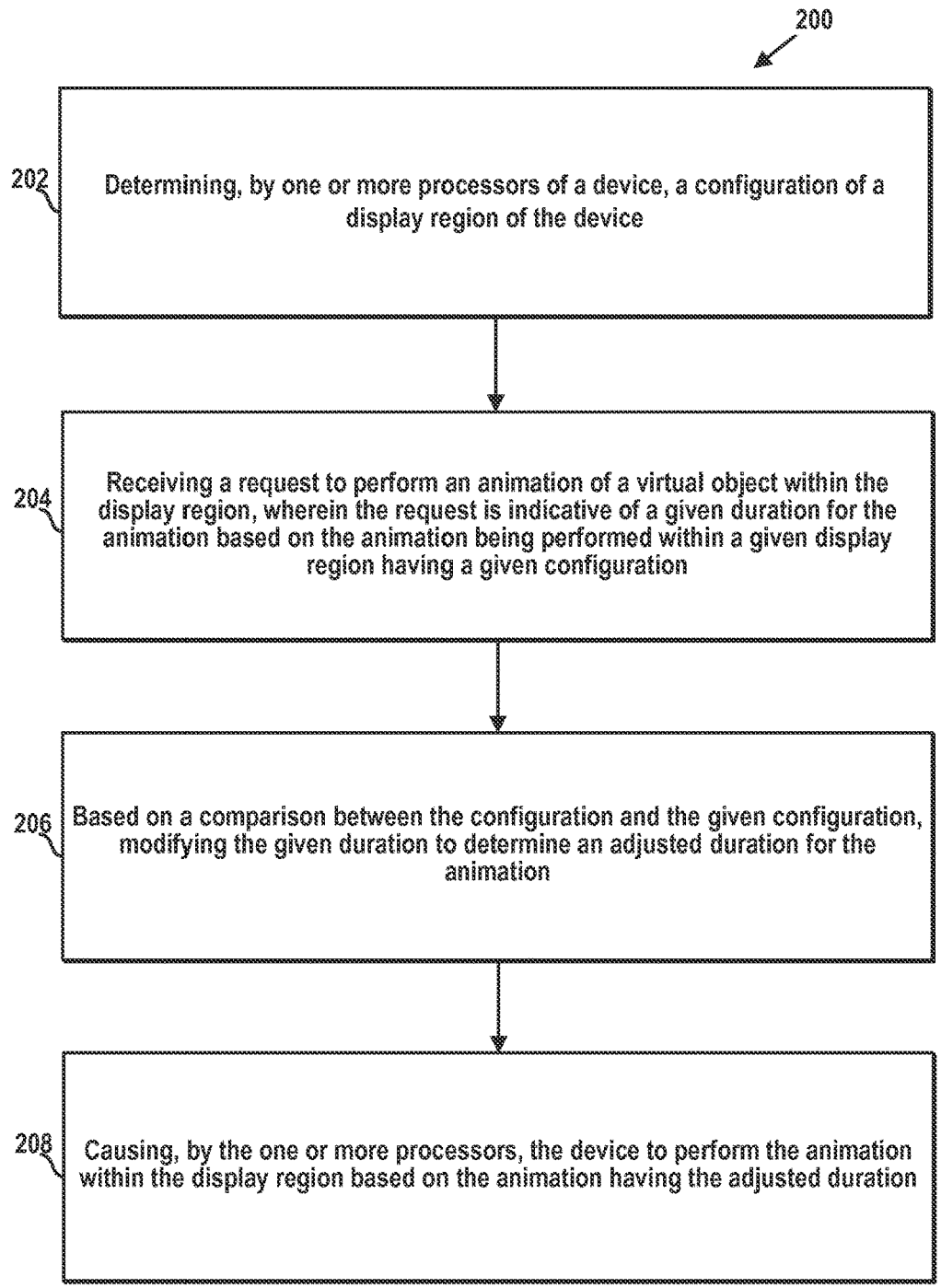
FIG. 2 is a block diagram of a method, according to an example embodiment.

FIG. 2 is a block diagram of a method 200, according to an example embodiment. Method 200 shown in FIG. 2 presents an embodiment of a method that could be used with the device 100, for example. Method 200 may include one or more operations, functions, or actions as illustrated by one or more of blocks 202-208. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 200 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 200 and other processes and methods disclosed herein, each block in FIG. 2 may represent circuitry that is wired to perform the specific logical functions in the process.

At block 202, the method 200 includes determining a configuration of a display region of a device by one or more processors of the device. The device may be a computing device such as the device 100 of FIGS. 1A-1B. Thus, for example, the display region may correspond to the display 102 or a portion of the display 102. In turn, at block 202, the method 200 includes determining the configuration of the display region such as the size of the display region or the resolution (e.g., pixel resolution) of the display region. By way of example, the device may include an LCD display having a 30 inch width and a 20 inch height. Further, for example, such display may have a pixel count of 800 pixels for the width and 600 pixels for the height. The display region may include the entire display or may be a part of the display. For example, half of the display may correspond to the display region for a user interface of an application and another half may correspond to another display region for another user interface of another application. Other examples are possible. In addition to the size and resolution, in some examples, other configuration settings may be determined, such as brightness, contrast, refresh rate, or any other configuration settings for the display region.

At block 204, the method 200 includes receiving a request to perform an animation of a virtual object within the display region. The request may be indicative of a given duration for the animation based on the animation being performed within a given display region having a given configuration.

The virtual object may include any graphic object suitable for display in the display region. For example, the virtual object may include a button, menu, check box, or other object in a user interface of an application, such as the application 104a and 104b of FIG. 1A. Additionally or alternatively, in some examples, the virtual object may include an image or a geometric shape rendered on the display region by the device. Other examples are possible such as a cartoon character, text, or any other graphic element.

Referring back to FIG. 1A, in some examples, the request may be provided by an application, such as the applications 104a-104b, to the API 106 or the operating system 108. The API 106 and/or the operating system 108 may then analyze the request via the one or more processors to identify the animation and the virtual object in the request.

The animation may include various animations such as translating, fading, rotating, resizing, a combination of these, etc., of the virtual object on the display region. Thus, in some examples, the animation may indicate transforming the virtual object from an initial state to a final state over the given duration. By way of example, the initial state may correspond to a first image and the final state may correspond to a second image. Thus, in this example, the animation may indicate gradually transforming the virtual object over the given duration from the first image to the second image.

Additionally, the request may include an indication of the given duration for the animation. For example, an application providing the request to transform the virtual object from the initial state to the final state may also indicate that the transformation is to be performed over the given duration. By way of example, the application may specify a specific period of time (e.g., the given duration) such as one second over which the application requests the animation to be performed. In turn, for example, the method 200 may include rendering intermediate states of the virtual object separated by fractions of the one second at a speed to cause the animation to be performed over the one second on the display region. Such initial, intermediate, and final states may be implemented as a time-series of animation steps to provide a perception of motion of the virtual object from the initial state to the final state, for example.

Further, the given duration indicated by the request may be based on the animation being performed on the given display region having the given configuration. Various implementations in the present disclosure are possible for identifying an association between the given duration and the given configuration of the given display region. A non-exhaustive list of possible implementations is presented below.

In a first implementation, the association may be indicated in the request. For example, the request may have the form of a structured instruction that includes an indication of the given configuration where the given duration is appropriate. In particular, the request may include a particular configuration (e.g., size, resolution, etc.) expected in the display region where the animation is to be performed. The given configuration, for example, may be indicated in an xml tag or other data structure associated with the request.

In a second implementation, the association may be indicated in configuration data pertaining to an application providing the request. For example, the application may include metadata or other specification data that describes a particular device configuration (e.g., preferred display region configuration, etc.) where the application may preferably operate. The application may also include other identifying information such as, for example, a version of the application (e.g., mobile version, web version, desktop version, etc.). Such identifying information may also be utilized to determine the given configuration.

In a third implementation, the method 200 and other methods, devices, and systems in the present disclosure may utilize an interface for receiving the request that facilitates identifying such association. Referring back to FIG. 1A, for example, at least some of the functions of the method 200 may be implemented via an application programming interface (API) such as the API 106 or an operating system such as the operating system 108. In an example scenario, the API 106 may provide a framework for an author of the applications 104a and/or 104b to provide the given duration using one or more configuration-independent (e.g., size-independent-duration, resolution-independent-duration, etc.) time units. Such framework may be described to the author in a documentation of the API 106, for example. As an example of a size-independent-duration (sid) time unit, the API 106 may define 1 sid to correspond to 1 ms on a 6 squared inch display region (e.g., 2 inch by 3 inch, etc.). As an example of a resolution-independent-duration (rid) time unit, the API 106 may define 1 rid to correspond to 1 ms on a 100 dots-per-inch (dpi) display region. Other custom time units are possible and are described in greater detail in other embodiments of the present disclosure, such as time units associated with a pixel size of the virtual object (e.g., area of the virtual object in terms of number of pixels) or time units associated with a viewer of the display region (e.g., viewing angle degrees, distance to display region, etc.). Additionally or alternatively, in some examples, other time units may be provided that are associated with a combination of the criteria described above. For example, a device-independent-duration (did) time unit may be associated with both the size and the resolution of the display region.

Accordingly, in some examples, the method 200 may also include the one or more processors receiving an input having a time unit associated with the given configuration of the given display region. For example, the input may be indicative of the given duration having one or more of the configuration-independent time units described above.

At block 206, the method 200 includes modifying the given duration to determine an adjusted duration for the animation based on a comparison between the configuration and the given configuration. In some examples, an intended viewer perception of the animation may not be achieved if the animation is performed over the given duration indicated by the request. By way of example, if the given configuration indicates that the given duration is appropriate for the given display region having a small size (e.g., smartphone display), the animation may be perceived incorrectly when performed on the display region having a larger size (e.g., television screen). For example, where the animation corresponds to transitioning the virtual object, the animation may appear to be moving too fast on the larger size display region due to a distance of the transition being greater on the larger size display region than the smaller size display region.

Accordingly, in some examples, the device may determine the adjusted duration that is appropriate for the configuration of the display region where the animation is to be performed. For example, if the given display region associated with the given duration has a larger size and/or a greater resolution than the display region of the device, the adjusted duration may be determined to be less than the given duration such that the animation may cause the virtual object to transition at a same or similar speed intended by the given duration. In some examples, the adjusted duration may be determined by applying various functions on the given duration, such as linear scaling, non-linear scaling, function mapping, lookup tables, etc.

Further, in some examples, the adjusted duration may be alternatively determined to be greater than the given duration based on a type of the animation or other factors in accordance with the intended viewer perception of the animation. In one example, if the animation were a rotation instead of a transition, the method 200 may be configured to alternatively determine the adjusted duration to be greater than the given duration. Thus, in accordance with the present disclosure, various configurations of the method 200 are possible for determining the adjusted duration based on the comparison between the configuration and the given configuration.

In some examples, as described at block 204, the method 200 may include receiving the given duration as an input having a time unit associated with the given configuration of the given display region. By way of example, the given duration may be received as 300 did (i.e., 300 ms on a 2 inch by 3 inch display region having a 100 dpi resolution). Accordingly, in some examples, the method 200 may also include determining a scaling factor for the time unit based on the comparison between the configuration and the given configuration. Further, the scaling factor may include a combination of one or more scaling factors associated with various configuration criteria of the display region. For example, a first scaling factor may be associated with the resolution and a second scaling factor may be associated with the size. Thus, for example, if the display region of the device has the configuration that corresponds to a 4 inch by 6 inch display region and a 400 dpi resolution, the first scaling factor may correspond to (100 dpi/400 dpi)=(¼) and the second scaling factor may correspond to (4 inches/2 inches)=(2). In turn, the scaling factor that includes both the first scaling factor and the second scaling factor may correspond to (¼)*(2)=(½). Further, in some examples, the method 200 may also include determining the adjusted duration based on the scaling factor and the input. Thus, for example, the adjusted duration may correspond to (½)*300 did=150 ms.

Therefore, within examples, systems and methods of the present disclosure may include receiving the given duration in a format that is independent from the configuration of the display region where the animation may be performed.

At block 208, the method 200 includes the one or more processors causing the device to perform the animation within the display region based on the animation having the adjusted duration. For example, where the animation corresponds to transforming the virtual object from an initial state to a final state, the one or more processors may cause the device to generate a time-series of animation steps that include a plurality of intermediate states of the virtual object. Further, in the example, the series of animation steps may be performed on the display region such that the initial state, the intermediate states, and the final state appear on the display region according to a time-sequence that occurs over the adjusted duration. Thus, in some examples, the animation may be performed on the display region of the device while maintaining the viewer perception corresponding to the animation being performed on the given display region having the given configuration indicated by the request.

Figure 3:
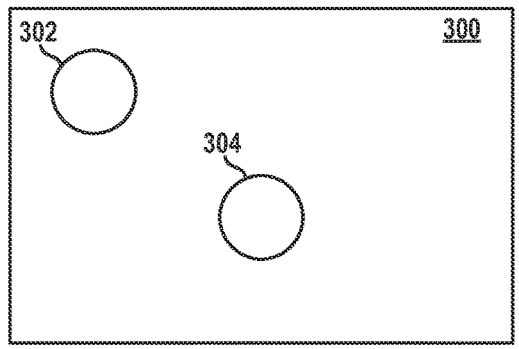
FIG. 3 illustrates a scenario for performing an animation on two display regions and having different sizes, according to an example embodiment.
Figure 3:
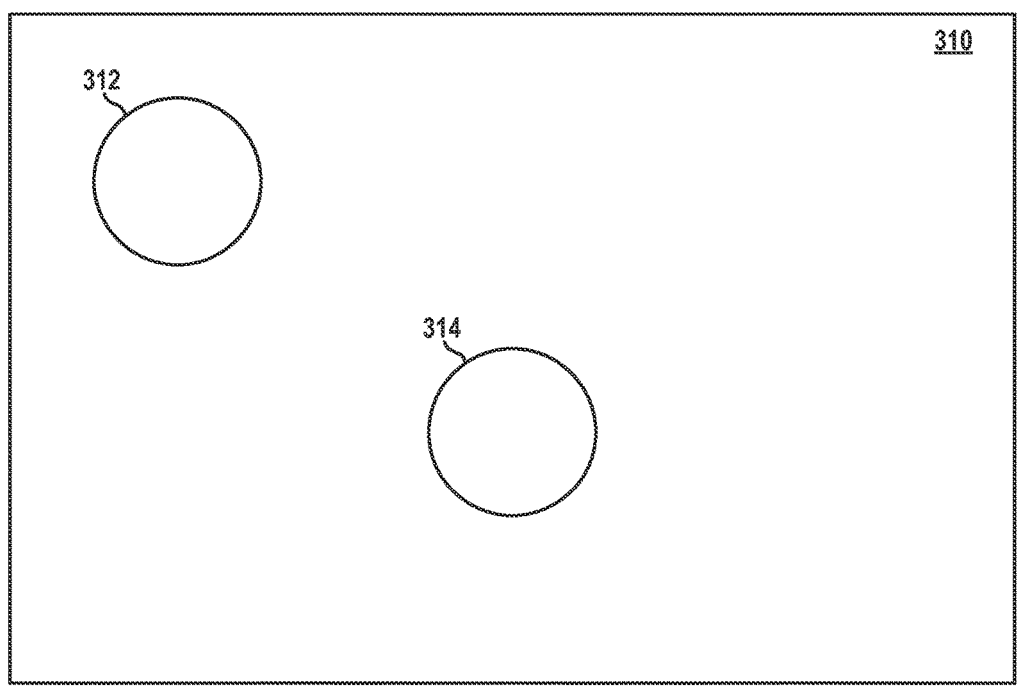

FIG. 3 illustrates a scenario for performing an animation on two display regions 300 and 310 having different sizes, according to an example embodiment. The display regions 300 and 310 may be operated by a device such as the device 100 to perform the animation in accordance with the method 200. For example, the display region 300 may correspond to part or all of the display 102 in the device 100 of FIG. 1A, and may be operated via the method 200 to perform the animation of a virtual object in the display region 300. The display region 310 may be similarly operated.

The animation may correspond to transforming the virtual object from a first state 302 to a second state 304 over a given duration. As illustrated in FIG. 3, for example, the animation may correspond to traversing the virtual object along the display region 300 from a first position indicated by the first state 302 to a second position indicated by the final state 304. Thus, for example, the display region 300 may display a series of animation steps along a path from the first position to the second position over the given duration such that the virtual object appears to be in continuous motion. Although illustrated in FIG. 3 that the animation corresponds to a traversal, in some examples, the animation may include other operations such as rotation, modification of sizing, fading, flipping, a combination of these, etc. For example, the first state 302 may correspond to the virtual object being at a given position and having a particular size and the second state 304 may correspond to the virtual object being at the given position but having a different size. In this example, the animation may be performed on the display region 300 as the series of animation steps that show the virtual object having various intermediate sizes over the given duration. Other example animations are possible.

Although illustrated in FIG. 3 that the virtual object has a circular shape in the first state 302 and the second state 304, other shapes of the virtual object are possible. For example, the virtual object may correspond to a square, triangle, star, other geometric shape, text, button, menu, or any other graphic element. Additionally or alternatively, the virtual object may have different appearances in the first state 302 and the second state 304. For example, the animation may correspond to transforming the virtual object from the circular shape at the first state 302 to a rectangular shape at the second state 304 over the given duration. Thus, in this example, the animation steps may correspond to a plurality of intermediate shapes of the virtual object such that the virtual object appears to transform gradually from the circular shape to the rectangular shape over the given duration.

Further, as illustrated in FIG. 3, the same animation performed on the display region 300 may also be performed on the second display region 310. For example, the animation may correspond to gradually transforming the virtual object from a first state 312 to a second state 314 similarly to the transformation from the first state 302 to the second state 304. However, in some examples, the given duration for the animation may be inappropriate for performing the animation on the display region 310. As illustrated in FIG. 3, for example, the display region 310 may be larger than the display region 300. In turn, the virtual object on the display region 310 may travel a greater distance than the virtual object on the display region 300 when the same animation is performed. Consequently, for example, the series of animation steps over the given duration may be perceived as a continuous motion of the virtual object on the display region 300, but may be perceived as discrete steps on the display region 310.

Therefore, within examples, the device operating the display region 310 may determine an adjusted duration for the animation as described in the method 200. For example, a request for performing the animation may indicate that the given duration is associated with a size of the display region 300. In turn, the device may compare the size of the display region 300 with a corresponding size of the display region 310, and adjust the given duration accordingly. For example, the display region 300 may have a width of 3 inches, and the second display region 310 may have a width of 6 inches. In this example, the device may scale the given duration by a scaling factor of (6 inches/3 inches)=2 to determine the adjusted duration. For example, if the given duration was 120 ms, the adjusted duration may be determined as 2*120 ms=240 ms. Thus, for example, the animation may be performed on the display region 310 with the longer duration (e.g., 240 ms) to provide an appropriate viewer perception (e.g., the continuous motion).

Figure 4:
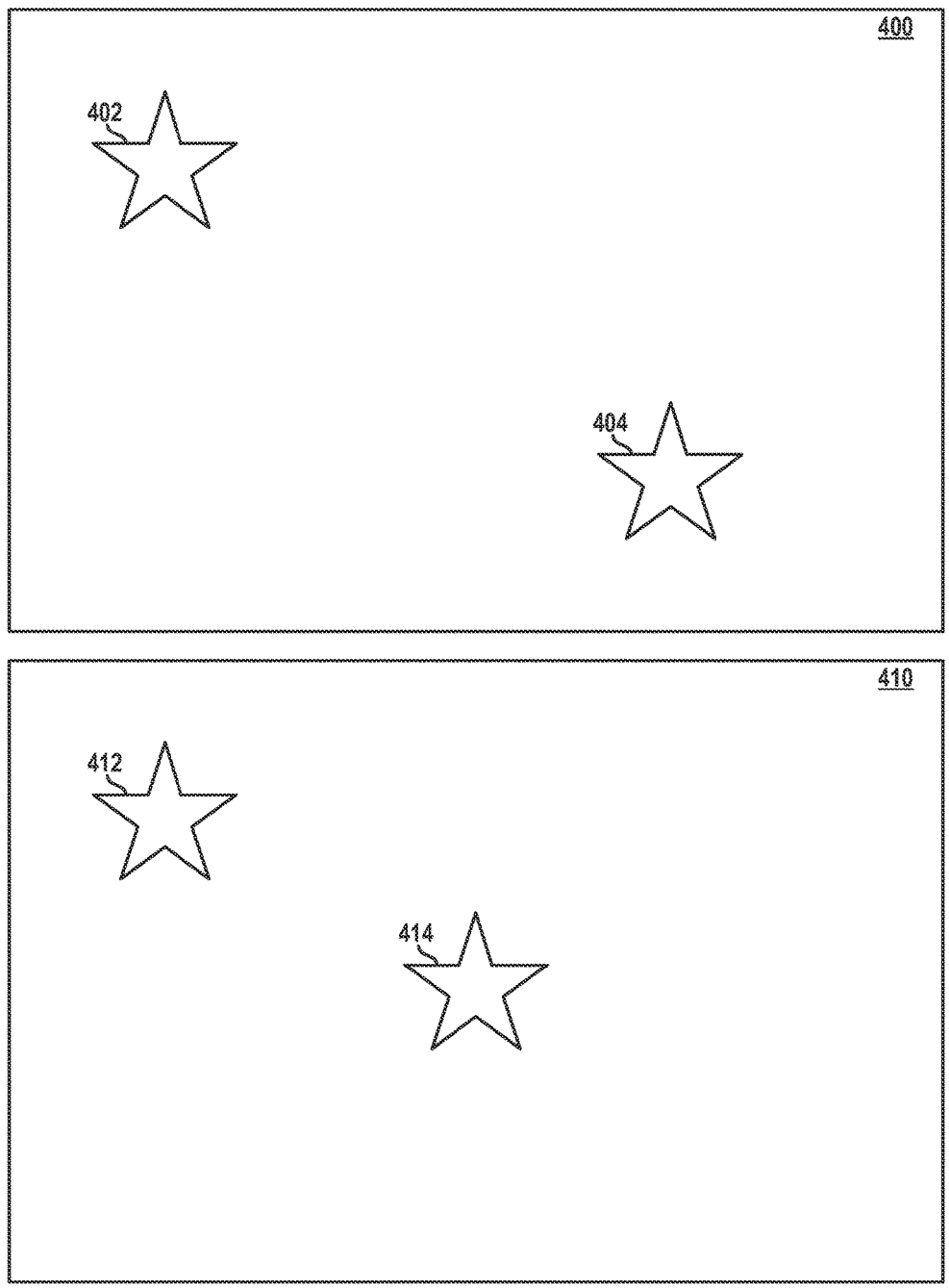
FIG. 4 illustrates a scenario for performing an animation on two display regions and having different resolutions, according to an example embodiment.

FIG. 4 illustrates a scenario for performing an animation on two display regions 400 and 410 having different resolutions, according to an example embodiment. The display regions 400 and 410 may be operated by a device such as the device 100 to perform the animation in accordance with the method 200. For example, the display region 400 may correspond to part or all of the display 102 in the device 100 of FIG. 1A, and may be operated via the method 200 to perform the animation of a virtual object in the display region 400. The display region 410 may be similarly operated.

In the scenario illustrated in FIG. 4, the animation may correspond to traversing the virtual object from a first position indicated by a first state 402 to a second position indicated by a second state 404 along the display region 400. For example, the animation may include translating the virtual object by 400 pixels horizontally and 300 pixels vertically over the given duration. Therefore, in this example, the animation may indicate moving the virtual object a distance of sqrt[$(300)^2+(400)^2$]=500 pixels. In some examples, the device operating the display region 400 may perform the animation as follows. The device may cause the display region to render the virtual object having a series of positions along a path between the first position and the second position as a series of animation steps. The series of animation steps may be performed at time intervals within the given duration. For example, if the given duration is 100 ms, the device may generate 100 animation steps each separated by 1 ms. In this scenario, the animation steps may correspond to the virtual object at the following 100 distances from the first position: 0 pixels, 5 pixels, 10 pixels, . . . , 490 pixels, 495 pixels, 500 pixels. In turn, the virtual object may appear to be gradually traversing from the first position indicated by the first state 402 to the second position indicated by the second state 404.

Additionally, as illustrated in FIG. 4, the same animation may be performed on the display region 410. For example, the animation may cause a virtual object in the display region 410 to traverse from a first state 412 to a second state 414. Further, in the example scenario, such traversal may also correspond to 500 pixels. However, as illustrated in FIG. 4, the 500 pixels may correspond to a different distance on the display region 410 than a corresponding distance on the display region 400. For example, the display region 400 may have a resolution of 200 dpi and the display region 410 may have a resolution of 400 dpi. Thus, for example, the 500 pixels may correspond to (500 pixels/200 dpi)=2.5 inches on the display region 400, and (500 pixels/400 dpi)=1.25 inches on the display region 410. Accordingly, performing the animation over the given duration may cause the virtual object to have a different speed on the display region 400 than a corresponding speed on the display region 410.

However, as described in the method 200, a device operating the display region 410 may determine an adjusted duration for the animation to provide an intended viewer perception of the animation (e.g., same speed, etc.). For example, the given duration may be scaled based on a comparison between resolutions of the display regions 400 and 410. In the example scenario of FIG. 4, the adjusted duration may be determined as (200 dpi/400 dpi)*100 ms=50 ms. In turn, the device may perform the animation on the display region 410 with the smaller adjusted duration (50 ms) to provide the intended viewer perception (e.g., same speed, etc.).

Additionally or alternatively, in some examples, the given duration for the animation may be provided as an input having a time unit associated with a given resolution of a given display region where the animation may be performed. For example, a device-independent-duration time unit (did) may be scaled to determine the adjusted duration for the animation. For example, 1 did may be defined to correspond to 1 ms on a 100 dpi resolution display region having dimensions of 2 inch by 3 inch, and the given duration may be provided as 200 did. By way of example, the display regions 400 and 410 may have the same dimensions of 2 inch by 3 inch but different resolutions. Thus, for example, when the animation is performed on the display region 400, the adjusted duration may be determined as 200 did*(10 dpi/200 dpi)*(2 inch/2 inch)*(3 inch/3 inch)=100 ms. Further, for example, when the animation is performed on the display region 410, the adjusted duration may be determined as 200 did*(100 dpi/400 dpi)*(2 inch/2 inch)*(3 inch/3 inch)=50 ms.

Figure 5:
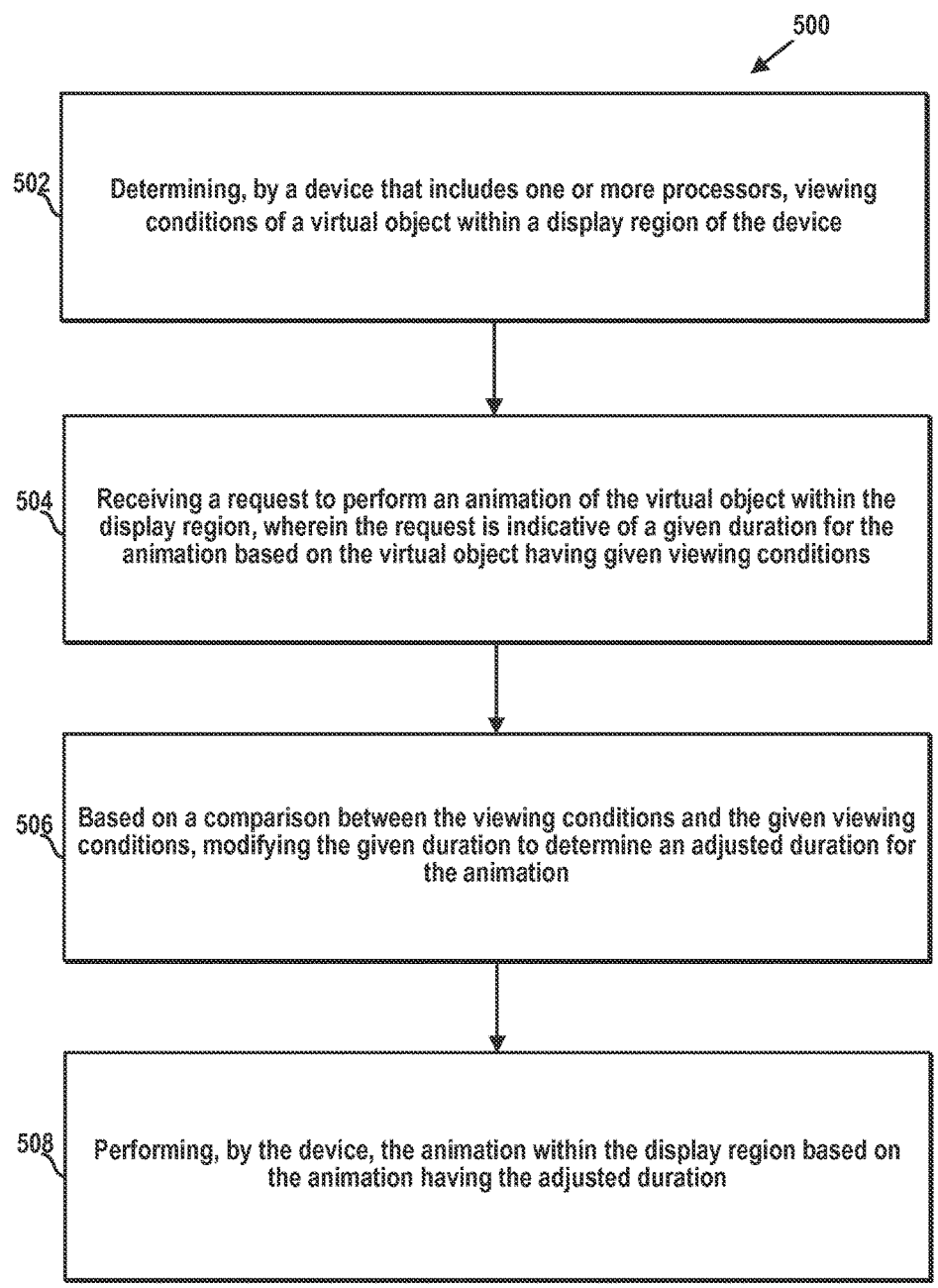
FIG. 5 is a block diagram of another method, according to an example embodiment.

FIG. 5 is a block diagram of another method 500, according to an example embodiment. Method 500 shown in FIG. 5 presents an embodiment of a method that could be used with the device 100, for example. Method 500 may include one or more operations, functions, or actions as illustrated by one or more of blocks 502-508. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

At block 502, the method 500 includes determining viewing conditions of a virtual object within a display region of a device that includes one or more processors. In some examples, the viewing conditions may include a configuration of the display region similarly the configuration described at the block 202 of the method 200. For example, the viewing conditions may include a size of the display region and/or a resolution of the display region.

Additionally or alternatively, in some examples, the viewing conditions may include other factors pertaining to the virtual object. For example, the viewing conditions may include a pixel size of the virtual object (e.g., area, number of pixels in the display region occupied by the virtual object, etc.). Further, in some examples, the viewing conditions may include factors pertaining to a viewing location from where the virtual object may be viewed. For example, the viewing conditions may include a position of the viewing location, a distance from the viewing location to the display region, or a viewing angle of the viewing location relative to the virtual object in the display region.

At block 504, the method 500 includes receiving a request to perform an animation of the virtual object within the display region. The request may be indicative of a given duration for the animation based on the virtual object having given viewing conditions.

In some examples, the method 500 may also include the device determining a pixel size of the virtual object in the display region. In these examples, the given duration indicated by the request may be based also on the virtual object having a given pixel size in the display region. For example, performing the animation over the given duration may provide an intended viewer perception based on the virtual object having the given pixel size (e.g., the given viewing conditions). By way of example, the animation may correspond to modifying a sizing of the virtual object by a given amount. If the virtual object has a small size, the given amount may correspond to a larger portion of the virtual object than if the virtual object has a large size. For example, increasing a width of the smaller virtual object by 10 pixels may correspond to 10% of the original width, while increasing a width of the larger virtual object by 10 pixels may only correspond to 2% of the original width. Thus, for example, the given duration that is appropriate for performing the animation on the smaller virtual object may be insufficient for performing the animation on the larger object while providing the same viewer perception.

The pixel size of the virtual object may differ from the given pixel size associated with the given duration for various reasons. In one example, an initial sizing of the virtual object may be defined based on dimensions of the display region. For example, the virtual object may be initially configured to have 30% of the width of the display region and 15% of the height of the display region. Thus, in this example, the actual pixel size of the virtual object may vary based on a configuration of the display region (e.g., size, resolution, etc.). In another example, the request for performing the animation may be configured to operate on various virtual objects without prior knowledge of pixel sizes of the virtual objects. For example, the sizing of the virtual object may be defined by one or more functions of an application in the device prior to the receipt of the request. Other reasons for the difference between the pixel size and the given pixel size are possible.

In some examples, the method 500 may also include determining an expected distance from a viewing location to the display region. In these examples, the given duration indicated by the request may be based also on the virtual object being at a given distance to the display region. The given distance to the display region may be one of the given viewing conditions that affect the viewer perception of the animation. By way of example, a first viewer of the animation from a short distance may perceive a greater change in viewing angle of the virtual object than a second viewer of the animation from a larger distance. Thus, for example, performing the animation over the given duration may provide the intended viewer perception to the first viewer but not to the second viewer. For example, the second viewer may perceive the animation to be too slow.

The method 500 may include various implementations for determining the expected distance. In some examples, the expected distance may be determined based on a particular configuration of the device. In one example, the particular configuration may indicate that the device is a hand-held device (e.g., smartphone, tablet, etc.). In this example, the viewing location may correspond to a viewer holding the device and the expected distance may be determined accordingly (e.g., 1 foot, etc.). In another example, the particular configuration may indicate that the display region is in a television screen coupled to the device (e.g., the device may be a desktop computer with an HDMI output to the television screen, etc.). Therefore, in this example, the viewing location may correspond to a viewer of the television screen and the expected distance may be determined accordingly (e.g., 10 feet, etc.). In yet another example, the particular configuration may indicate that the display region is included in a body-mountable display (e.g., eyeglass frame, wristwatch, etc.). In this example, the viewing location may correspond to a viewer of the body-mountable device and the expected distance may be determined accordingly (e.g., 1 inch, etc.).

In some examples, the method 500 may also include receiving an output from a sensor indicative of the expected distance from the viewing location to the display region. Referring back to FIG. 1B, for example, the sensors 118 may include one or more sensors for detecting the expected distance from the viewing location to the display region. For example, the sensor may include an infrared (IR) range sensor, a camera, a motion detector, a radar, a lidar, a combination of these, etc., that is configured to provide the output indicative of the expected distance. As a specific example, an IR range sensor positioned adjacent to the display region may provide the output indicating a particular distance to a viewer of the display region. In this example, the particular distance may be provided in the method 500 as the expected distance.

Additionally, similarly to the block 204 of the method 200, in some examples, at least some of the functions of the block 504 may be performed via an interface for receiving the request that facilitates associating the given duration with the given viewing conditions. Accordingly, in some examples, the method 500 may also include receiving an input having a time unit associated with the given viewing conditions of the virtual object. In these examples, the input may be indicative of the given duration. Referring back to FIG. 1A, for example, the API 106 may be configured to receive the given duration as an input having a time unit associated with the given viewing conditions of the virtual object on which the animation may be performed. In a first example, an area-independent-duration (aid) time unit may be defined such that 1 aid corresponds to 1 ms for a virtual object having an area of 10000 pixels. In a second example, a user-independent-duration (uid) time unit may be defined such that 1 uid corresponds to 1 ms for a 1° of change in the viewing angle of the virtual object.

At block 506, the method 500 includes modifying the given duration to determine an adjusted duration for the animation based on a comparison between the viewing conditions and the given viewing conditions. In some examples, the comparison may include comparing viewing conditions such as pixel size of the virtual object or distance from a viewing location to the display region.

In a first example, if the given duration is associated with the virtual object having the given pixel size of 5,000 pixels, and the actual pixel size of the virtual object is 50,000 pixels, the given duration may be scaled by a factor of (50000/5000)=10 to determine the adjusted duration. Thus, in this example, the animation may be performed over the adjusted longer duration that is appropriate for the larger virtual object. In a second example, if the given duration is associated with the viewing location being 12 inches away from the display region, and the expected distance is 60 inches, the given duration may be scaled by a factor of (12/60)=⅕ to determine the adjusted duration. Thus, in this example, the animation may be performed over the adjusted shorter duration that is appropriate for the further viewing location.

Although the example scenarios presented above apply linear scaling to determine the adjusted duration, other schemes are possible such as non-linear scaling, function mapping, lookup tables, etc. Further, in some examples, the intended viewer perception of the animation may correspond to criteria other than the speed of the animation, and the adjusted duration may be determined accordingly.

In some examples, as described at block 504, the method 500 may include receiving the given duration as an input having a time unit associated with the given viewing conditions of the virtual object. Accordingly, in some examples, the method 500 may also include determining a scaling factor for the time unit based on the comparison between the viewing conditions and the given viewing conditions. By way of example, a user-independent-duration (uid) time unit may be defined such that 1 uid corresponds to 1 ms for a 1° of change in the viewing angle. Thus, for example, if the input indicates the given duration for the animation as 30 uid and the change in the viewing angle is determined as 4.95°, the adjusted duration may be determined to correspond to 30 uid*4.95°=148.5 ms.

At block 508, the method 500 includes the device performing the animation within the display region based on the animation having the adjusted duration. For example, where the animation is indicative of transforming the virtual object from an initial state to a final state, the device may generate a plurality of states of the virtual object on the display region as a series of animation steps that occur over the adjusted duration.

Figure 6:
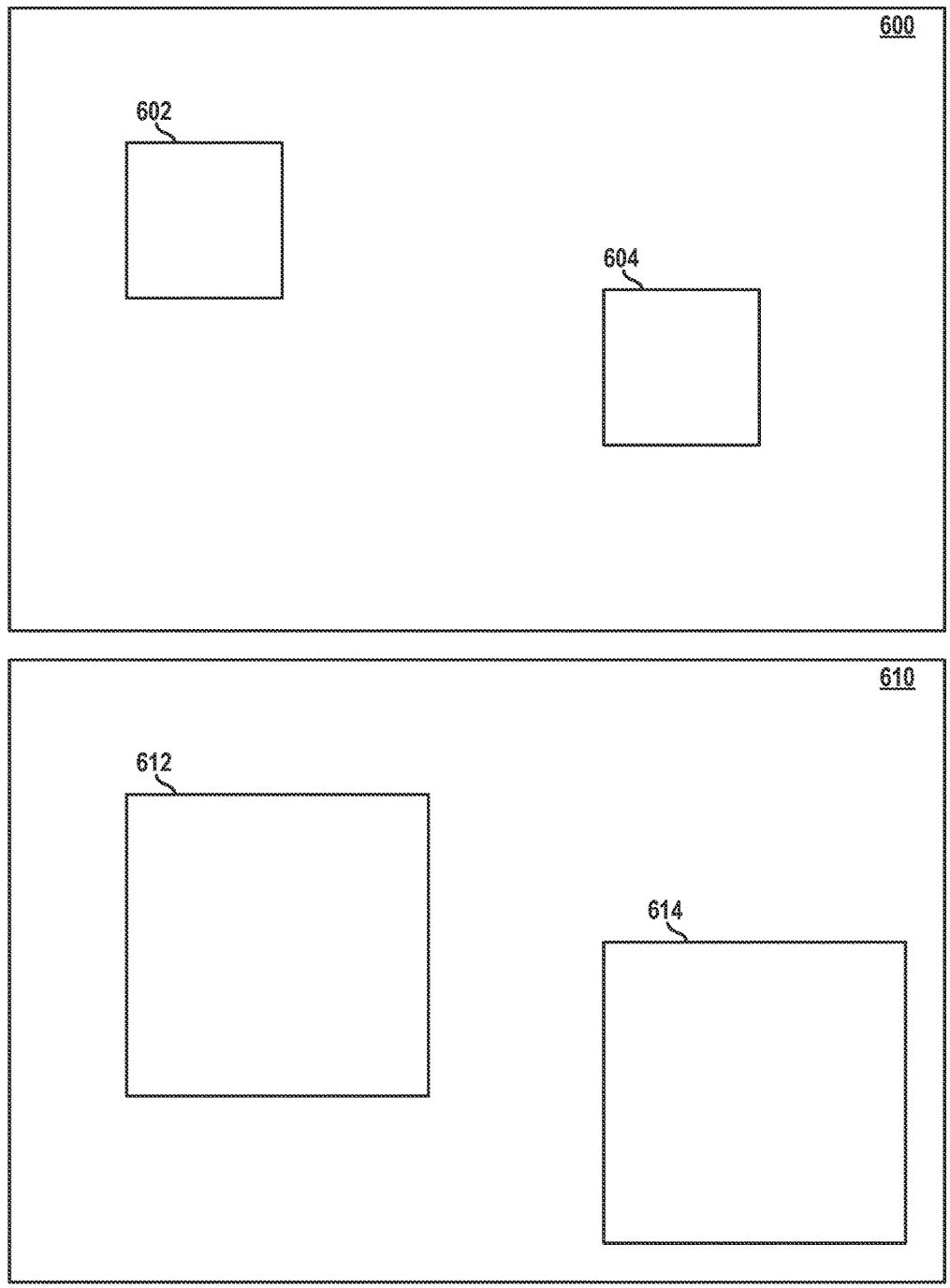
FIG. 6 illustrates a scenario for performing an animation on two virtual objects having different pixel sizes, according to an example embodiment.

FIG. 6 illustrates a scenario for performing an animation on two virtual objects having different pixel sizes, according to an example embodiment. In FIG. 6, display regions 600 and 610 may be operated by a device such as the device 100 to perform the animation in accordance with the method 200 and/or the method 500. For example, the display region 600 may correspond to part or all of the display 102 in the device 100 of FIG. 1A, and may be operated via the method 500 to perform the animation of a virtual object in the display region 600. The display region 610 may be similarly operated.

As illustrated in FIG. 6, the animation may correspond to traversing the virtual object from a first position indicated by a first state 602 to a second position indicated by a second state 604 over a given duration. By way of example, the traversal may correspond to 400 pixels horizontally and 300 pixels vertically. Thus, in this example, performing the animation may cause the virtual object to traverse a distance of sqrt$[(300)^2+(400)^2]$=500 pixels. Additionally, as illustrated in FIG. 6, the same animation may be performed on the display region 610 to similarly transform a virtual object from a first state 612 to a second state 614. Further, for example, such traversal on the display region 610 may also correspond to a same distance of 500 pixels.

However, as illustrated in FIG. 6, the virtual object in the display region 600 may have a smaller pixel size than the virtual object in the display region 610. In some examples, the given duration for the animation may be appropriate for the smaller pixel size of the virtual object in the display region 600. For example, the given duration of 50 ms may be sufficient for a viewer of the animation to perceive motion of the virtual object from the first state 602 to the second state 604 on the display region 600. However, for example, the given duration of 50 ms may be insufficient for providing the same perception of motion of the larger virtual object in the display region 610. For example, a virtual object having a pixel size of 5,000 pixels that traverses a distance of 500 pixels over 50 ms may be perceived differently from a virtual object having a pixel size of 50,000 pixels that traverses the same distance of 500 pixels over the 50 ms. The distance traveled for the larger virtual object is much smaller relative to the size of the larger virtual object and thus a longer duration may be appropriate for the viewer to perceive the motion correctly.

Therefore, in some examples, the device operating the display region 610 may determine an adjusted duration for the animation based on the pixel size of the virtual object in the first state 612. For example, the given duration may be associated with the smaller virtual object in the display region 600 having a pixel size of 5,000 pixels. However, the virtual object on the display region 610 may have a larger pixel size of 50,000 pixels. In this example, the adjusted duration for performing the animation on the display region 610 may be determined as (50000 pixels/5000 pixels)*50 ms=500 ms.

Additionally or alternatively, in some examples, the given duration may be provided as an input having a time unit associated with a given pixel size. For example, an area-and-device-independent-duration time unit (adid) may be defined such that 1 adid corresponds to 1 ms for a virtual object having the given pixel size of 10,000 pixels on a 100 dpi resolution display region. In this example, the display regions 600 and 610 may have the same 100 dpi resolution, but different pixel sizes. Further, in this example, the given duration may be provided as 100 adid. Thus, in the example scenario, the adjusted duration may be determined as (100 dpi/100 dpi)*(5,000/10,000)*100 adid=50 ms for the virtual object in the display region 600. Further, in the example scenario, the adjusted duration may be determined as (100 dpi/100 dpi)*(50,000/10,000)*100 adid=500 ms for the virtual object in the display region 610.

Figure 7:
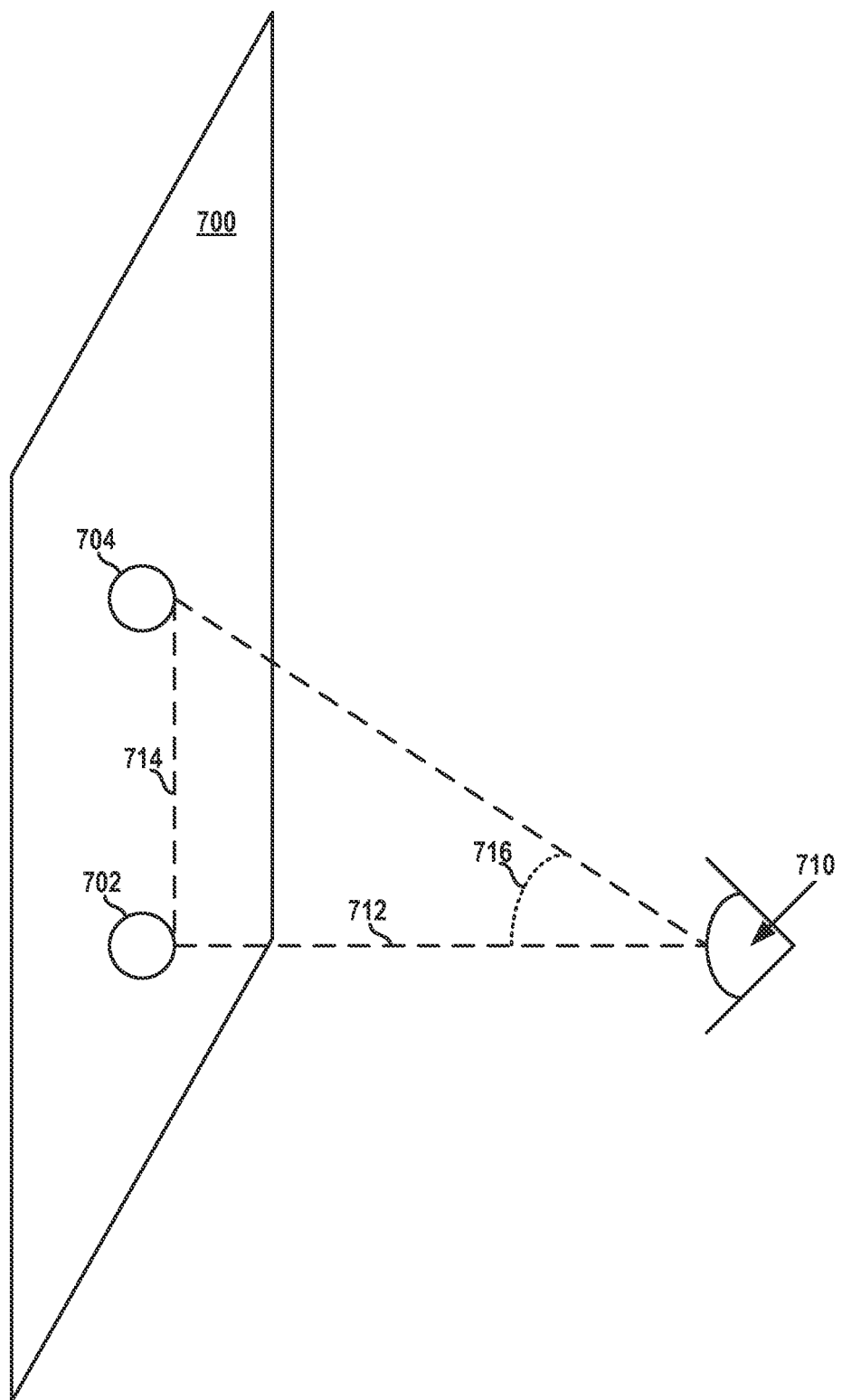
FIG. 7 illustrates a display region viewable from a viewing location, according to an example embodiment.

FIG. 7 illustrates a display region 700 viewable from a viewing location 710, according to an example embodiment. The display region 700 may be operated by a device such as the device 100 to perform an animation in accordance with the method 200 and/or the method 500. For example, the display region 700 may correspond to part or all of the display 102 in the device 100 of FIG. 1A, and may be operated via the method 500 to perform the animation of a virtual object in the display region 700. FIG. 7 illustrates an example scenario for adjusting duration of the animation based on an expected distance 712 from the viewing location 710 to the virtual object at the first state 702. In some examples, the expected distance 712 may be an actual distance, such as a distance measured by a sensor of the device that is operating the display region 700. In other examples, the expected distance 712 may be determined based on a configuration of the device (e.g., hand-held device, body-mountable device, wall-mounted device, etc.) that is operating the display region 700. Thus, the viewing location 710 may correspond, for example, to an expected or actual position of a viewer viewing the animation.

The animation may include transforming the virtual object from a first state 702 to a second state 704 over a given duration. As illustrated in FIG. 7, for example, such transformation may correspond to traversing the virtual object from a first position indicated by the first state 702 to a second position indicated by the second state 704. Further, for example, such traversal may correspond to the virtual object moving a distance 714 along the display region 700. In the example scenario, the viewer perception of the animation may be based on the expected distance 712 corresponding to a given distance associated with the given duration. For example, a change in viewing angle 716 may be larger for a viewer closer to the display region 700 than a viewer that is further from the display region 700. Thus, in some examples, a request to perform the animation may indicate the given distance from the viewing location 710 to the display region 700 that is appropriate for providing an intended viewer perception.

By way of example, the animation may correspond to the virtual object traversing 1.25 inches (e.g., the distance 714) along the display region 700. In the example, if the expected distance 712 is 1 foot (12 inches), the change in the viewing angle 716 may correspond to $(180°/\pi)$*arctan(1.25 inches/2 inches)=5.95°. However, if the expected distance 712 is 5 feet (60 inches), the change in the viewing angle 716 may correspond to $(180°/\pi)$*arctan(1.25 inches/60 inches) =1.19°. Thus, in this example, the viewer perception of the animation may differ according to the expected distance 712. In turn, for example, the given duration that is appropriate when the expected distance 712 is 12 inches may be inappropriate when the expected distance 712 is 60 inches (e.g., the animation may appear to be too slow when the given distance 712 is 60 inches).

In accordance with the methods and systems of the present disclosure, an adjusted duration for the animation may be determined to provide the intended viewer perception of the animation. By way of example, the given duration may be 150 ms. Further, in this example, the given duration indicated by the request may be based on the animation being viewed from the viewing location that is at a given distance of 1 foot (12 inches) from the display region 700. Thus, for example, when the animation is viewed from the given distance, the virtual object may appear to be moving at a first speed of 5.95/150 ms=39.67°/second. The first speed, for example, may be associated with the intended viewer perception of the animation. However, for example, if the viewing location was at the expected distance 712 of 5 feet (60 inches) from the display region, the virtual object may appear to be moving at a second speed of 1.19°/150 ms=7.93°/second. The second speed, for example, may cause an incorrect viewer perception of the animation. Therefore, in some examples, the adjusted duration may be determined to preserve the intended viewer perception. For example, the adjusted duration may be determined as (1.19)/(39.67°/second)=30 ms. Alternatively, for example, the adjusted duration may be determined based on a comparison between the given distance and the expected distance as (12 inches/60 inches)*150 ms=30 ms.

Additionally or alternatively, in some examples, the given duration may be provided as an input having a time unit associated with the given distance. In these examples, the adjusted duration may be determined based on applying one or more scaling factors on the time unit of the input. By way of example, a user-and-device-independent-duration (udid) time unit may be defined such that 1 uid corresponds to 1 ms for a 1° of change in the viewing angle of a 100 dpi resolution display region having dimensions of 2 inch by 3 inch. In the example, the display region 700 may have a 400 dpi resolution and the same dimensions of 2 inch by 3 inch. Thus, for example, if the input indicates the given duration for the animation as 100 udid and the change in the viewing angle 716 is determined as 5.94° (i.e., the expected distance 712 is 12 inches), the adjusted duration may be determined to correspond to 100 udid*5.94°*(100 dpi/400 dpi)*(2 inch/2 inch)*(3 inch/3 inch)=148.75 ms. Further, for example, if the change in the viewing angle 716 is determined as 1.19° (i.e., the expected distance 712 is 60 inches), the adjusted duration may be determined to correspond to 100 udid*1.19°*(100 dpi/400 dpi)*(2 inch/2 inch)*(3 inch/3 inch)=29.75 ms. Other example time units are possible that include additional criteria such as those described in the present disclosure, and may be scaled similarly.

Figure 8:
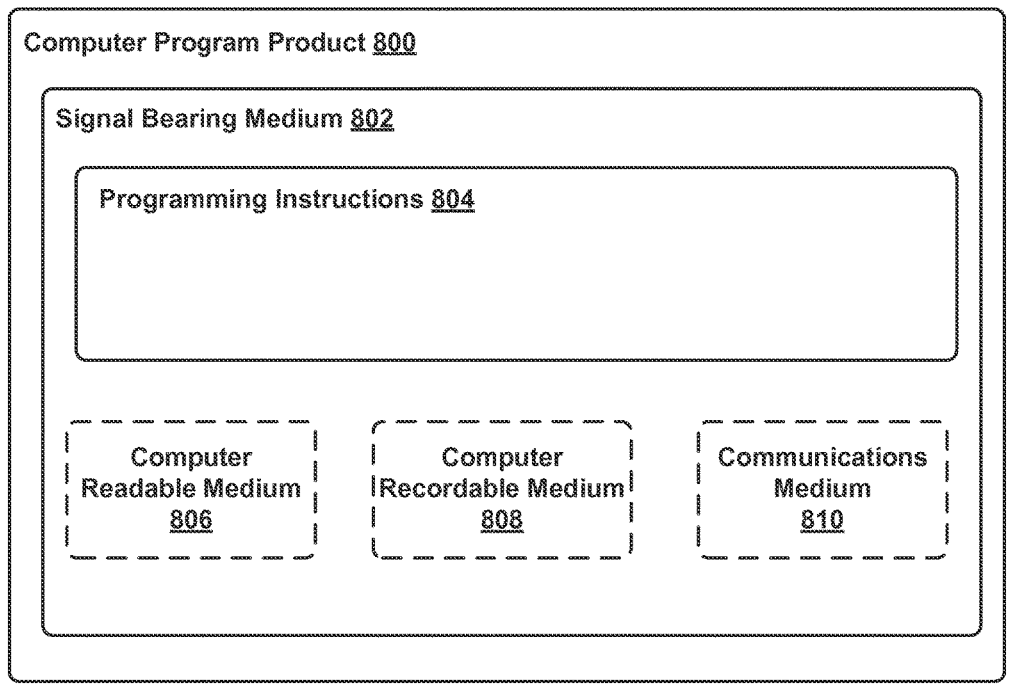
FIG. 8 depicts an example computer readable medium configured according to an example embodiment.

FIG. 8 depicts an example computer readable medium configured according to an example embodiment. In example embodiments, an example system may include one or more processors, one or more forms of memory, one or more input devices/interfaces, one or more output devices/interfaces, and machine readable instructions that when executed by the one or more processors cause the system to carry out the various functions tasks, capabilities, etc., described above.

As noted above, in some embodiments, the disclosed techniques (e.g. methods 200 and 500) may be implemented by computer program instructions encoded on a computer readable storage media in a machine-readable format, or on other media or articles of manufacture (e.g., program logic 122 of the device 100). FIG. 8 is a schematic illustrating a conceptual partial view of an example computer program product that includes a computer program for executing a computer process on a computing device, arranged according to at least some embodiments disclosed herein.

In one embodiment, the example computer program product 800 is provided using a signal bearing medium 802. The signal bearing medium 802 may include one or more programming instructions 804 that, when executed by one or more processors may provide functionality or portions of the functionality described above with respect to FIGS. 1-7. In some examples, the signal bearing medium 802 may be a computer-readable medium 806, such as, but not limited to, a hard disk drive, a Compact Disc (CD), a Digital Video Disk (DVD), a digital tape, memory, etc. In some implementations, the signal bearing medium 802 may be a computer recordable medium 808, such as, but not limited to, memory, read/write (R/W) CDs, R/W DVDs, etc. In some implementations, the signal bearing medium 802 may be a communication medium 810 (e.g., a fiber optic cable, a waveguide, a wired communications link, etc.). Thus, for example, the signal bearing medium 802 may be conveyed by a wireless form of the communications medium 810.

The one or more programming instructions 804 may be, for example, computer executable and/or logic implemented instructions. In some examples, a computing device may be configured to provide various operations, functions, or actions in response to the programming instructions 804 conveyed to the computing device by one or more of the computer readable medium 806, the computer recordable medium 808, and/or the communications medium 810.

The computer readable medium 806 may also be distributed among multiple data storage elements, which could be remotely located from each other. The computing device that executes some or all of the stored instructions could be an external computer, or a mobile computing platform, such as a smartphone, tablet device, personal computer, wearable device, etc. Alternatively, the computing device that executes some or all of the stored instructions could be remotely located computer system, such as a server.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
determining, by one or more processors of a device, a configuration of a display region of the device;
receiving a request to perform an animation of a virtual object within the display region, wherein the request is indicative of a first duration for the animation based on the animation being performed within a first display region having a first configuration;
comparing, by the one or more processors of the device, the configuration of the display region of the device with the first configuration of the first display region;
based on the comparison between the configuration of the display region of the device and the first configuration of the first display region, modifying the first duration to determine an adjusted duration for the animation; and causing, by the one or more processors, the device to perform the animation within the display region based on the animation having the adjusted duration.

2. The method of claim 1, further comprising:
receiving, by the one or more processors, an input having a time unit associated with the first configuration of the first display region, wherein the input is indicative of the first duration; and
determining, based on the comparison between the configuration and the first configuration, a scaling factor for the time unit, wherein modifying the first duration is based on the scaling factor and the input.

3. The method of claim 1, wherein the configuration is indicative of a size of the display region, and wherein the first configuration is indicative of a first size of the first display region, and wherein the comparison includes comparing the size with the first size.

4. The method of claim 3, wherein the adjusted duration is determined to be greater than the first duration based on the size being greater than the first size, and wherein the adjusted duration is determined to be less than the first duration based on the size being less than the first size.

5. The method of claim 1, wherein the configuration is indicative of a resolution of the display region, and wherein the first configuration is indicative of a first resolution of the first display region, and wherein the comparison includes comparing the resolution with the first resolution.

6. The method of claim 5, wherein the adjusted duration is determined to be greater than the first duration based on the resolution being greater than the first resolution, and wherein the adjusted duration is determined to be less than the first duration based on the resolution being less than the first resolution.

7. The method of claim 1, further comprising:
determining, by the one or more processors, a pixel size of the virtual object within the display region, wherein the first duration is based also on the virtual object having a first pixel size within the first display region, and wherein modifying the first duration is based also on a comparison between the pixel size and the first pixel size.

8. The method of claim 1, further comprising:
determining an expected distance from a viewing location to the display region, wherein the first duration is based also on the viewing location being at a first distance to the first display region, and wherein modifying the first duration is based also on a comparison between the expected distance and the first distance.

9. The method of claim 8, further comprising:
receiving, from a sensor, an output indicative of the expected distance from the viewing location to the display region, and wherein determining the expected distance is based on the output.

10. The method of claim 8, wherein determining the expected distance is based on a particular configuration of the device.

11. The method of claim 8, wherein the adjusted duration is determined to be greater than the first duration based on the expected distance being greater than the first distance, and wherein the adjusted duration is determined to be less than the first duration based on the expected distance being less than the first distance.

12. The method of claim 8, further comprising:
receiving, by the one or more processors, an input having a time unit associated with the first distance between the viewing location and the first display region, wherein the input is indicative of the first duration; and determining, based on the comparison between the expected distance and the first distance, a scaling factor for the time unit, wherein modifying the first duration is based on the scaling factor and the input.

13. The method of claim 1, wherein causing the device to perform the animation comprises transitioning the virtual object from a first position to a second position within the display region at a speed to cause the virtual object to traverse from the first position to the second position over the adjusted duration.

14. The method of claim 1, wherein causing the device to perform the animation comprises modifying a sizing of the virtual object within the display region at a speed to cause the modifying of the sizing to occur over the adjusted duration.

15. A non-transitory computer readable medium having stored therein instructions, that when executed by a computing device, cause the computing device to perform functions comprising:
determining a configuration of a display region of the computing device;
receiving a request to perform an animation of a virtual object within the display region, wherein the request is indicative of a first duration for the animation based on the animation being performed on a first display region having a first configuration;
comparing the configuration of the display region of the computing device with the first configuration of the first display region;
based on the comparison between the configuration of the display region of the device and the first configuration of the first display region, modifying the first duration to determine an adjusted duration for the animation; and
performing the animation within the display region based on the animation having the adjusted duration.

16. The non-transitory computer readable medium of claim 15, the functions further comprising:
determining a pixel size of the virtual object within the display region, wherein the first duration is based also on the virtual object having a given pixel size within the first display region, and wherein modifying the first duration is based also on a comparison between the pixel size and the first pixel size.

17. The non-transitory computer readable medium of claim 15, the functions further comprising:
determining an expected distance from a viewing location to the display region, wherein the first duration is based on the viewing location being at a first distance to the display region, and wherein modifying the first duration is based on a comparison between the expected distance and the first distance.

18. A device comprising:
one or more processors; and
data storage configured to store instructions executable by the one or more processors to cause the device to:
determine a configuration of a display region of the device;
receive a request to perform an animation of a virtual object within the display region, wherein the request is indicative of a first duration for the animation based on the animation being performed within a first display region having a first configuration;
comparing, by the one or more processors, the configuration of the display region of the device with the first configuration of the first display region;

based on the comparison between the configuration of the display region of the device and the first configuration of the first display region, modify the first duration to determine an adjusted duration for the animation; and perform the animation within the display region based on the animation having the adjusted duration.

19. The device of claim 18, wherein the configuration is indicative of a size of the display region, and wherein the first configuration is indicative of a first size of the first display region, and wherein the comparison includes comparing the size with the first size.

20. The device of claim 18, wherein the configuration is indicative of a resolution of the display region, and wherein the first configuration is indicative of a first resolution of the first display region, and wherein the comparison includes comparing the resolution with the first resolution.

* * * * *